No. 764,559. PATENTED JULY 12, 1904.
T. CARNEY.
CASH REGISTER.
APPLICATION FILED JUNE 14, 1901.
NO MODEL. 11 SHEETS—SHEET 1.
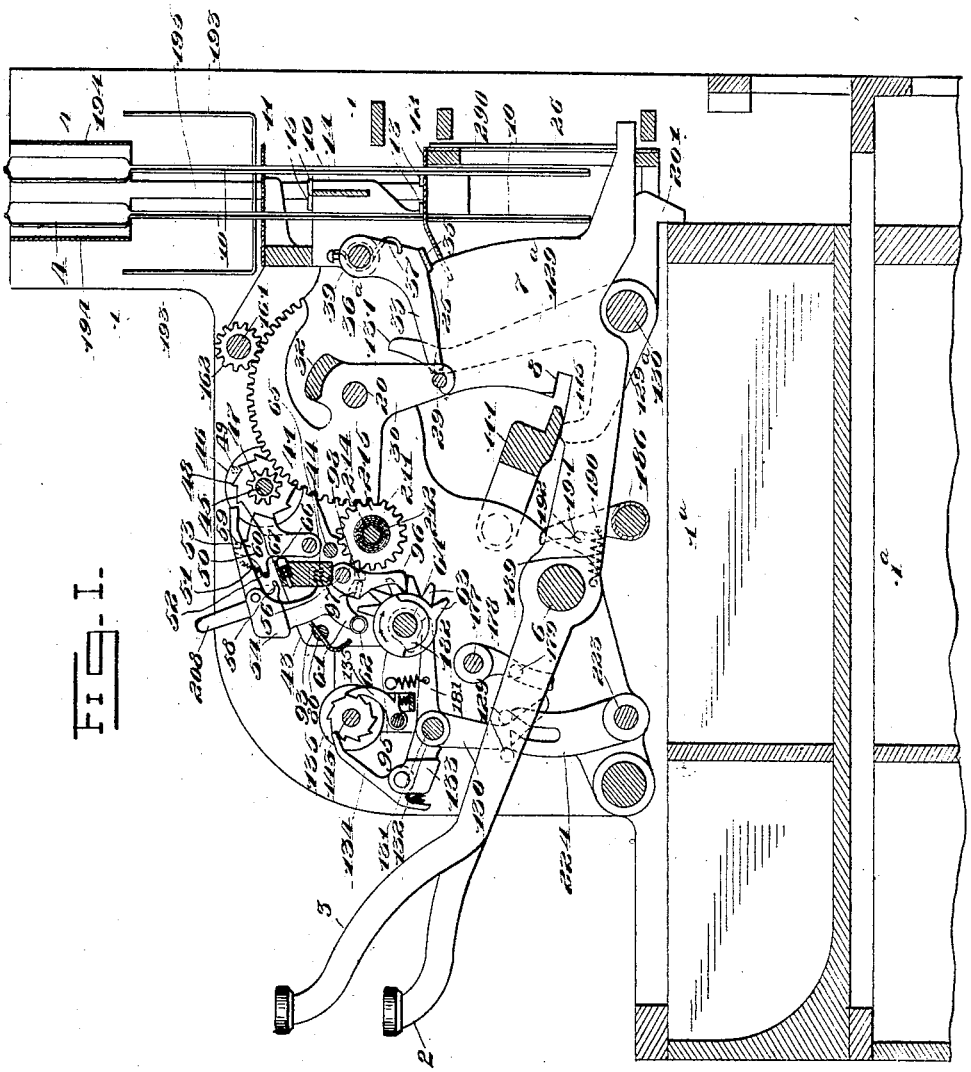

No. 764,559. PATENTED JULY 12, 1904.
T. CARNEY.
CASH REGISTER.
APPLICATION FILED JUNE 14, 1901.
NO MODEL.
11 SHEETS—SHEET 2.
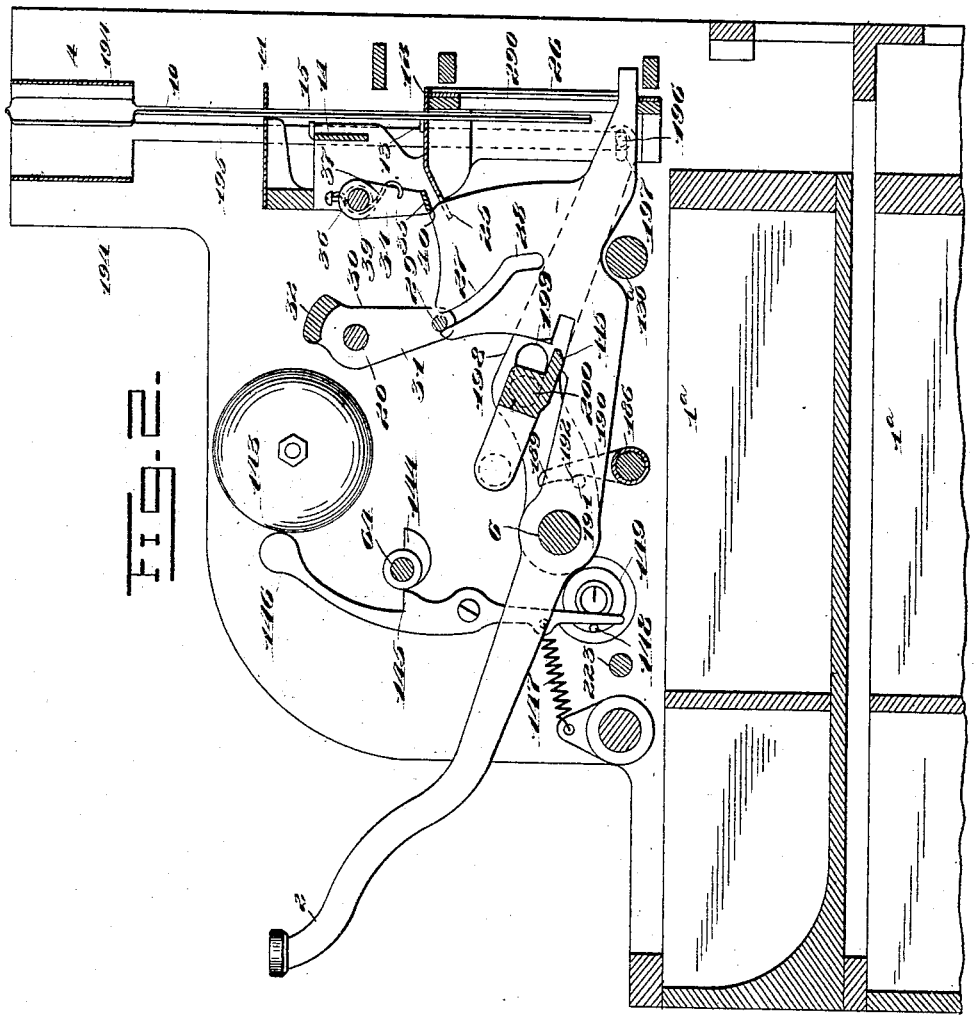

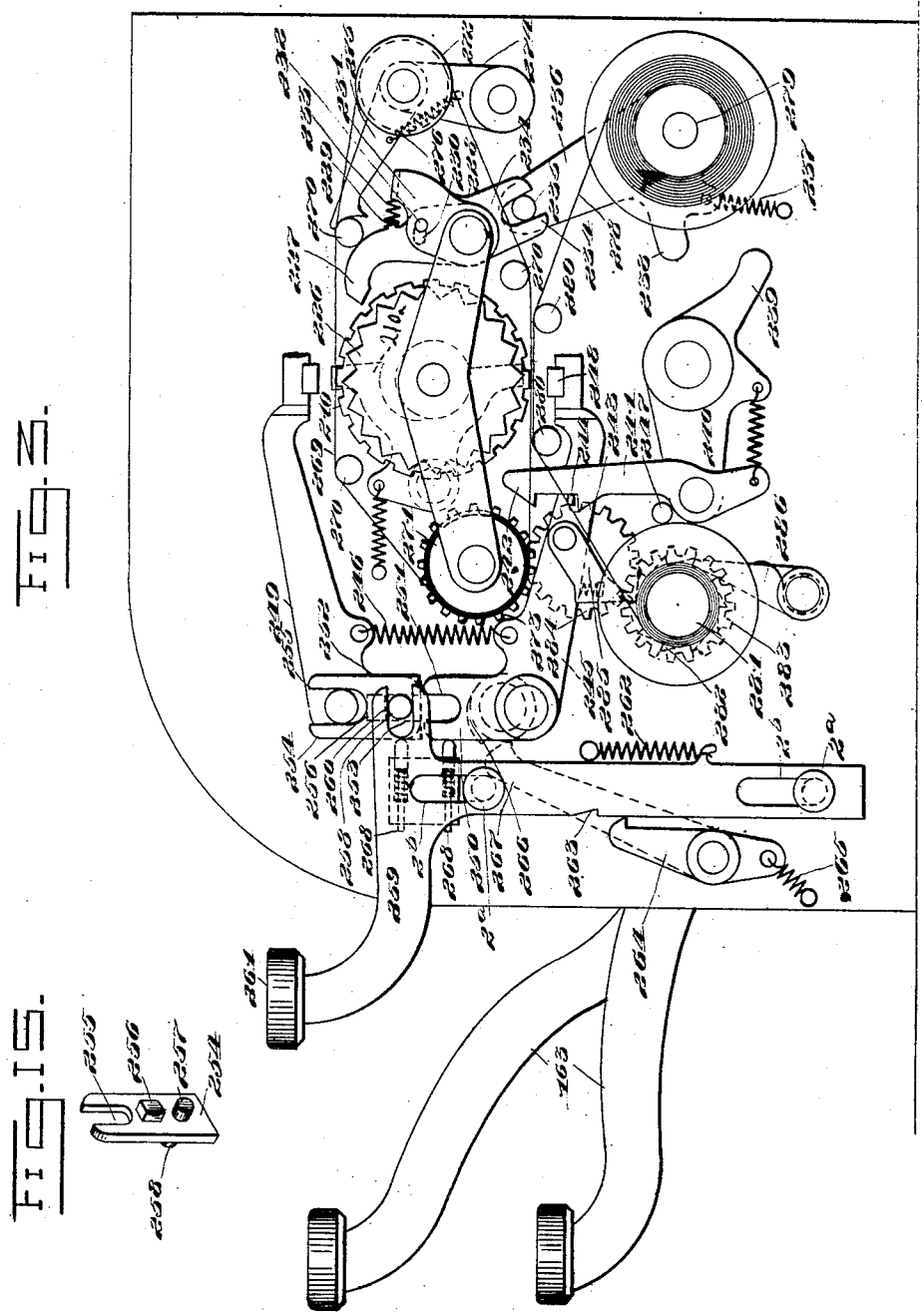

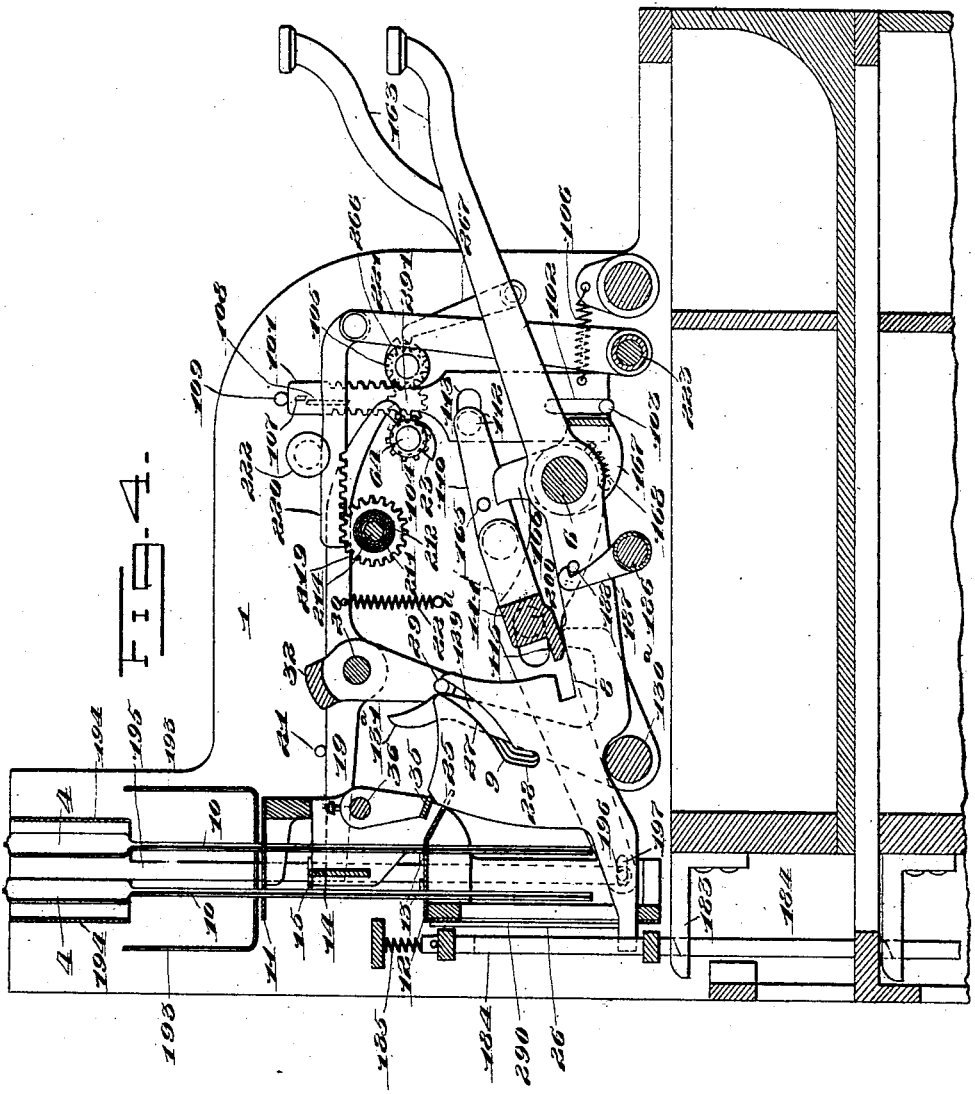

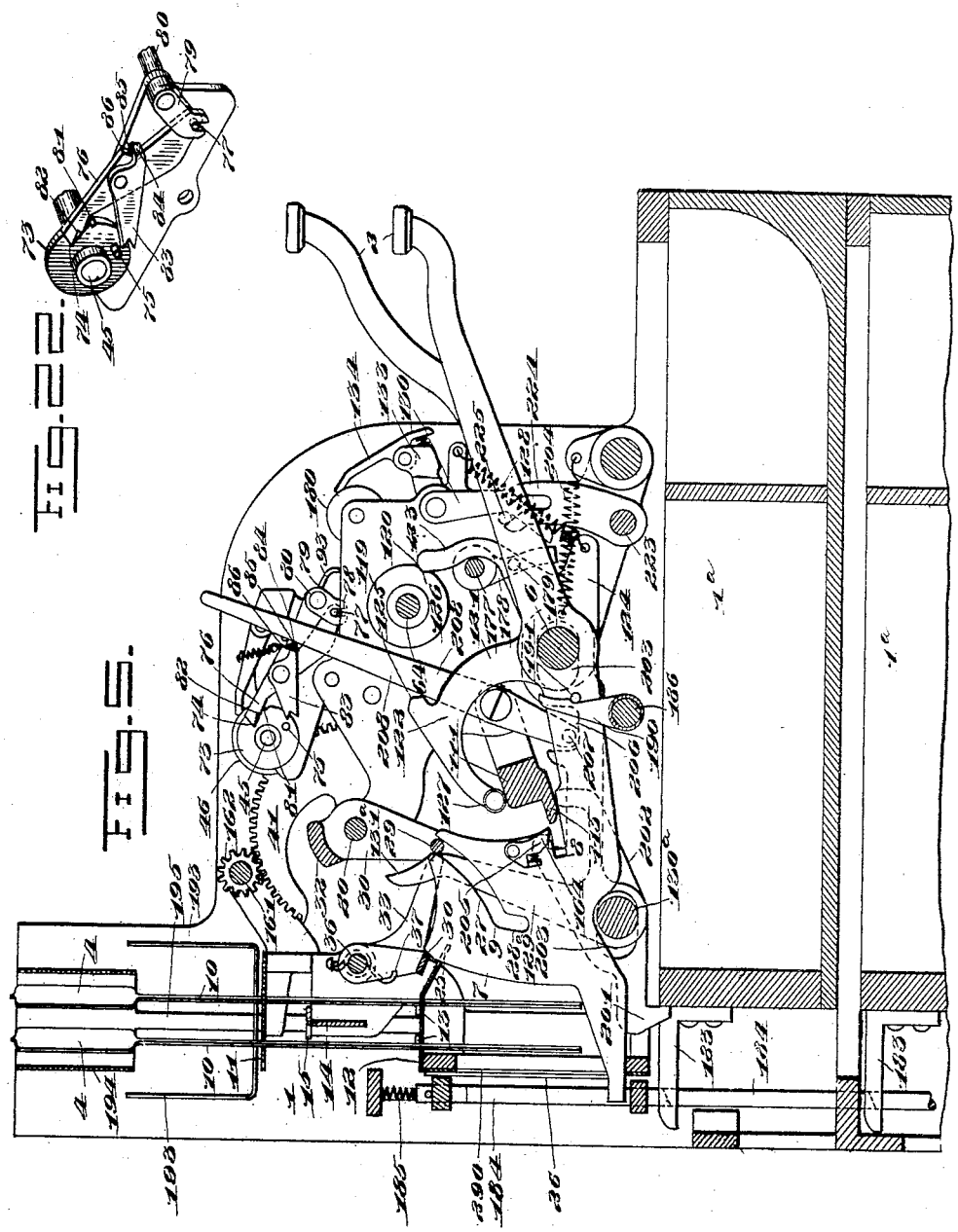

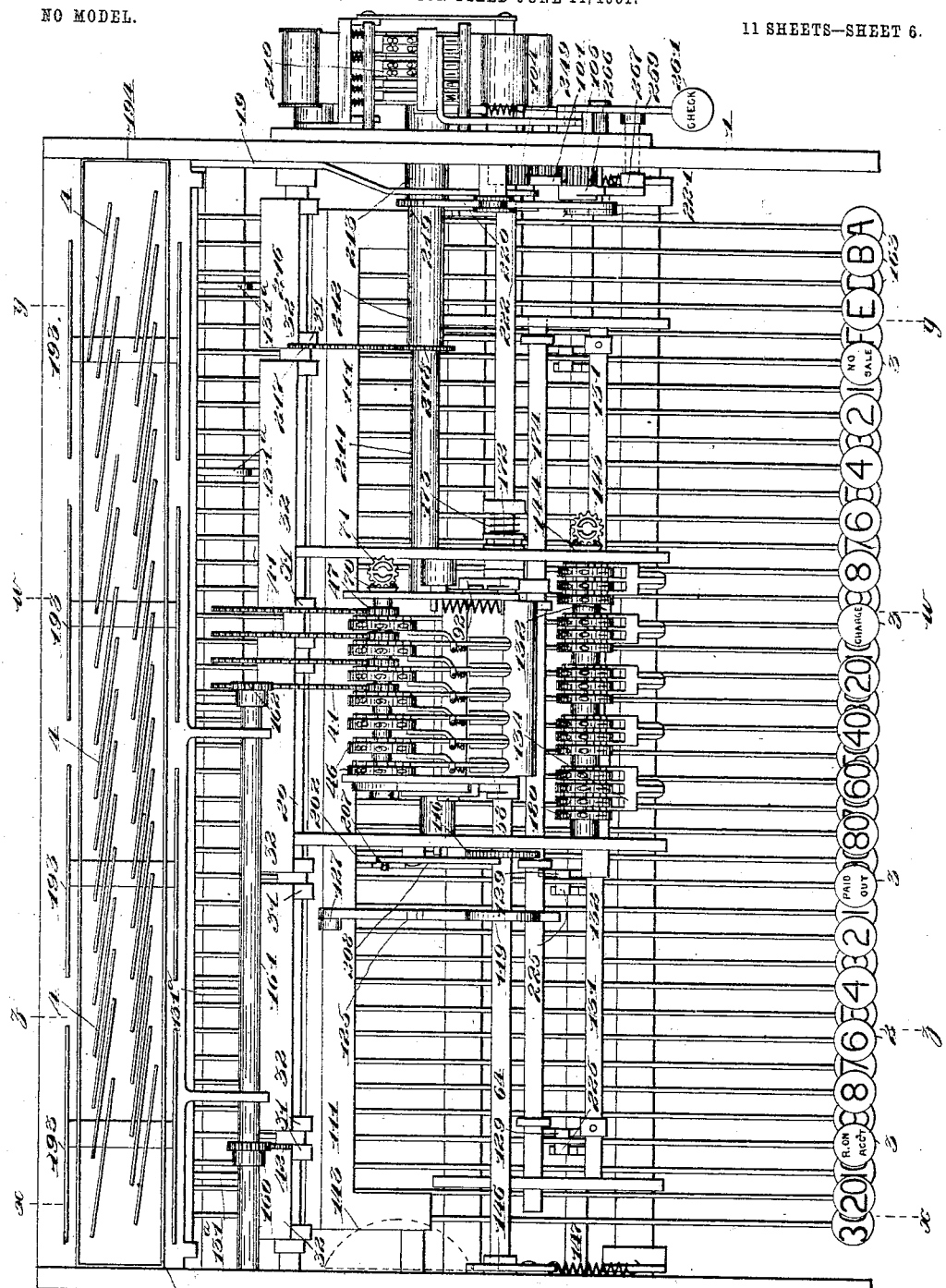

No. 764,559. PATENTED JULY 12, 1904.
T. CARNEY.
CASH REGISTER.
APPLICATION FILED JUNE 14, 1901.
NO MODEL. 11 SHEETS—SHEET 7.
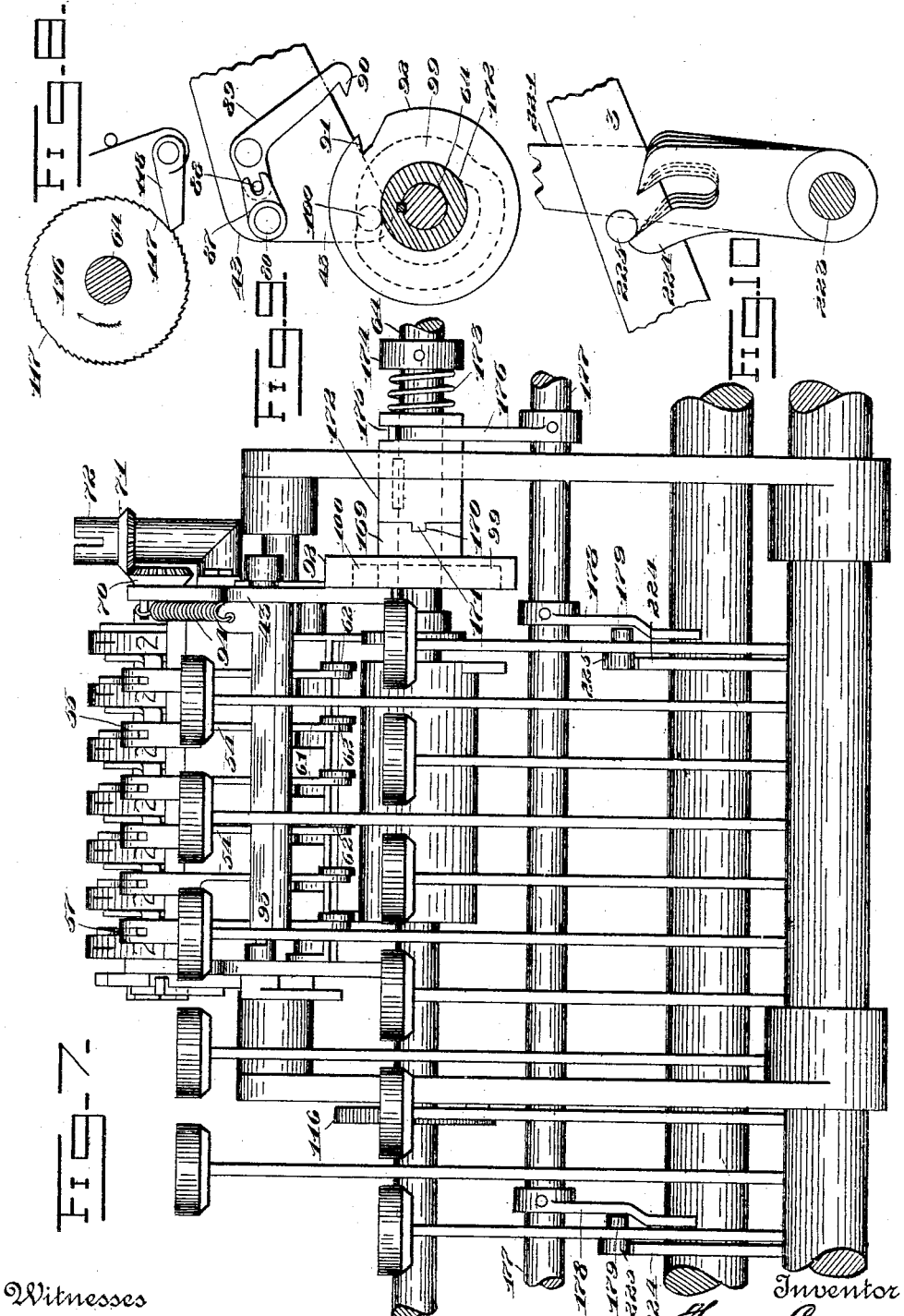
Witnesses
Wm. McCarthy
Inventor
Thomas Carney
By Alvan Macauley
Attorney

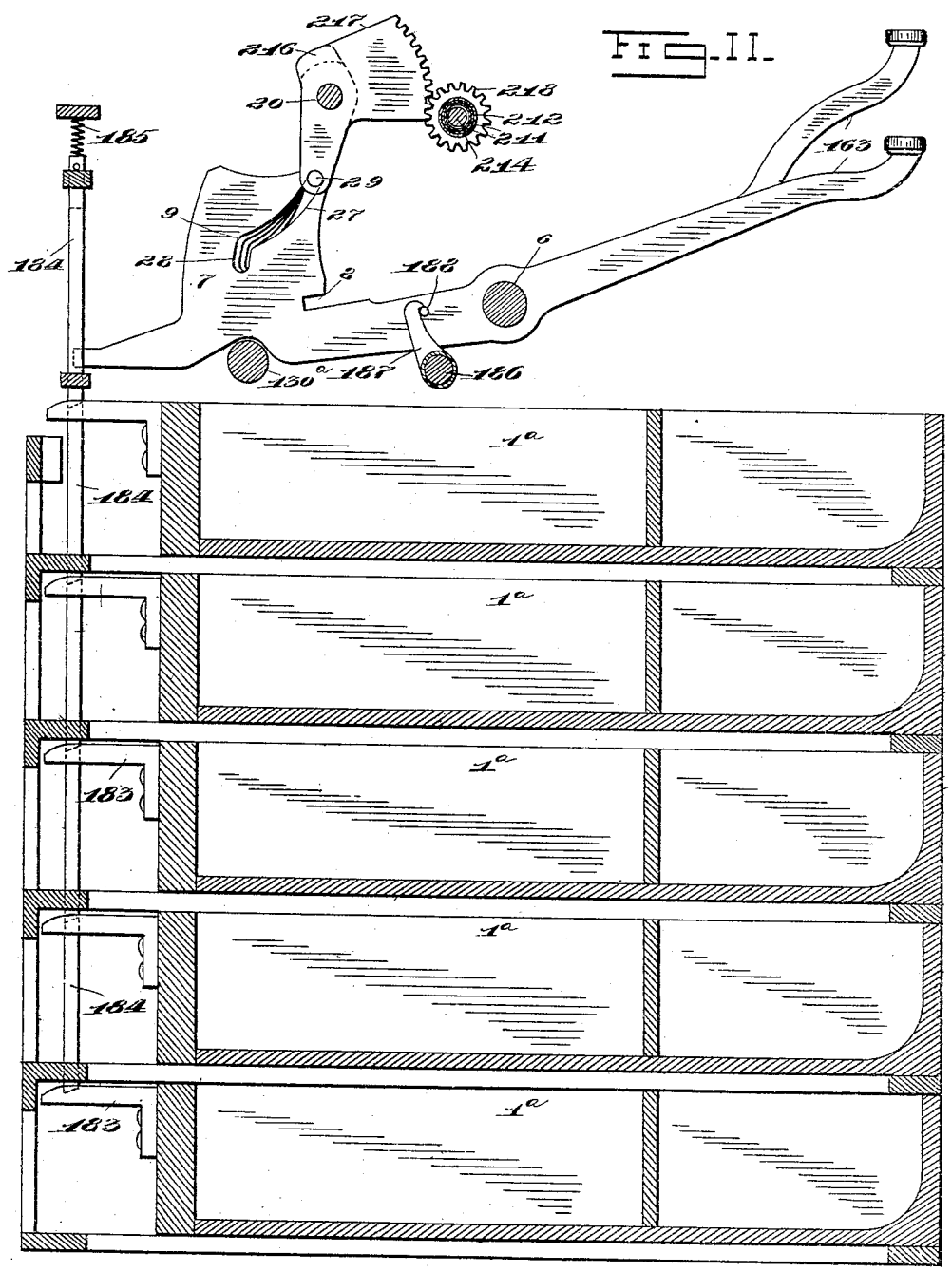

No. 764,559. PATENTED JULY 12, 1904.
T. CARNEY.
CASH REGISTER.
APPLICATION FILED JUNE 14, 1901.
NO MODEL. 11 SHEETS—SHEET 9.
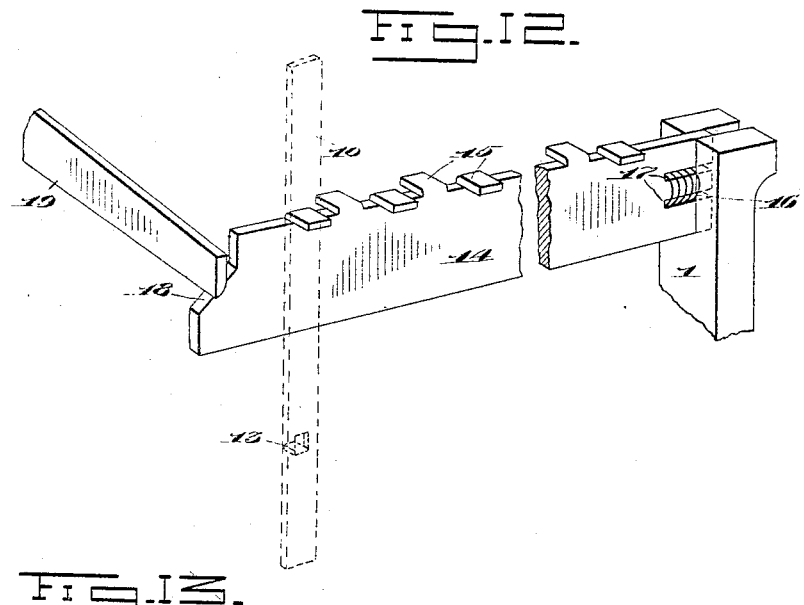
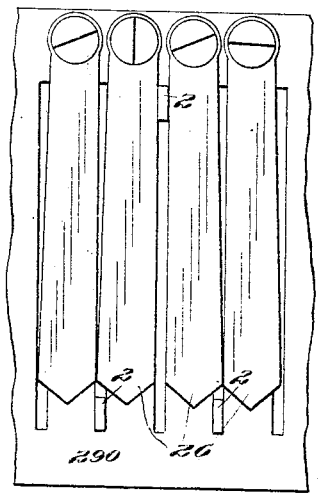
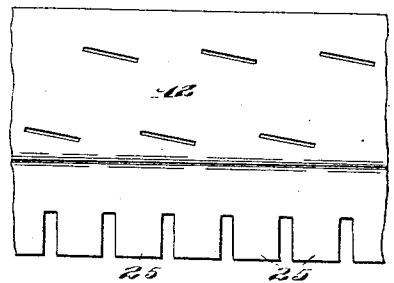
Witnesses
Wm. McCartley
Wm. A. Shingy
Inventor
Thomas Carney
By Alvan Macauley
Attorney No. 764,559. PATENTED JULY 12, 1904.
T. CARNEY.
CASH REGISTER.
APPLICATION FILED JUNE 14, 1901.
NO MODEL. 11 SHEETS—SHEET 10.
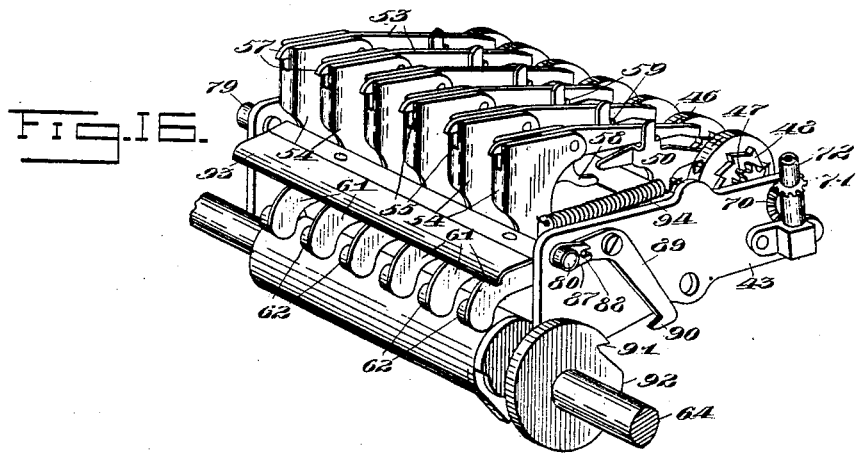
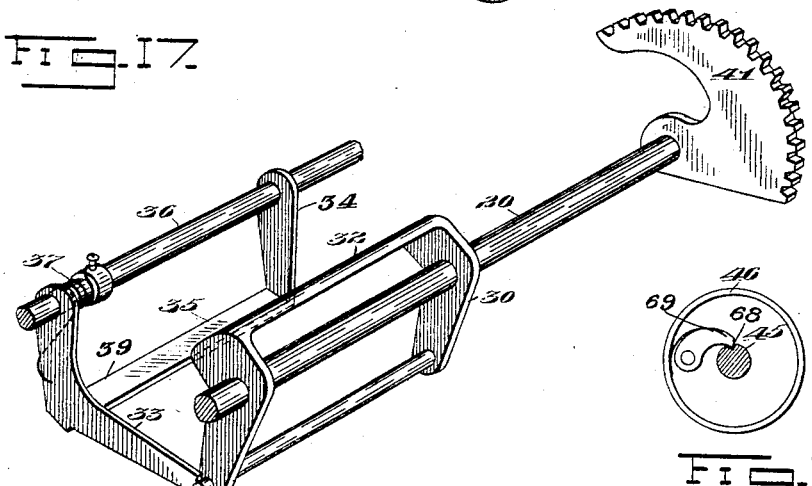
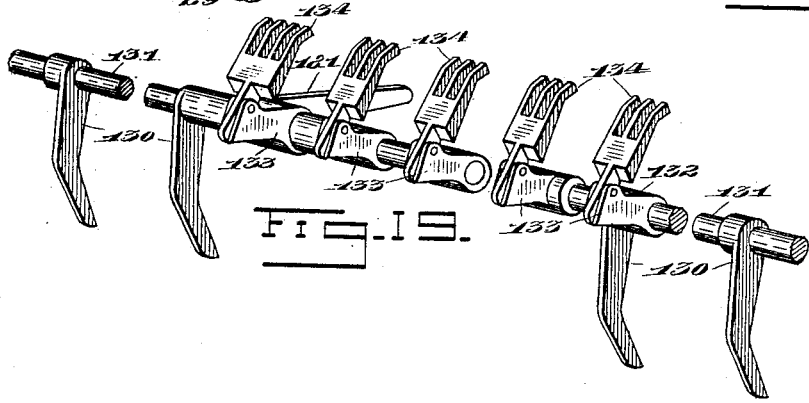
Witnesses
Inventor
Thomas Carney
By Alvan Macauley
Attorney No. 764,559. PATENTED JULY 12, 1904.
T. CARNEY.
CASH REGISTER.
APPLICATION FILED JUNE 14, 1901.
NO MODEL.
11 SHEETS—SHEET 11.

Witnesses
Wm. McCarthy
Wm. A. Muzzy

Inventor
Thomas Carney.
By Alvan Macauley.
Attorney

No. 764,559.

Patented July 12, 1904.

UNITED STATES PATENT OFFICE.

THOMAS CARNEY, OF DAYTON, OHIO, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 764,559, dated July 12, 1904.

Application filed June 14, 1901. Serial No. 64,557. (No model.)

*To all whom it may concern:*

Be it known that I, THOMAS CARNEY, a citizen of the United States, residing at Dayton, in the county of Montgomery and State of Ohio, have invented certain new and useful Improvements in Cash-Registers, of which I declare the following to be a full, clear, and exact description.

My invention relates to improvements in cash-registers.

The object of the invention will be more specifically hereinafter referred to and particularly pointed out in the appended claims.

Figure 20:
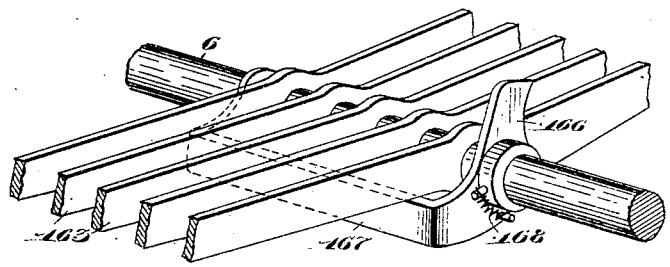
Figure 21:
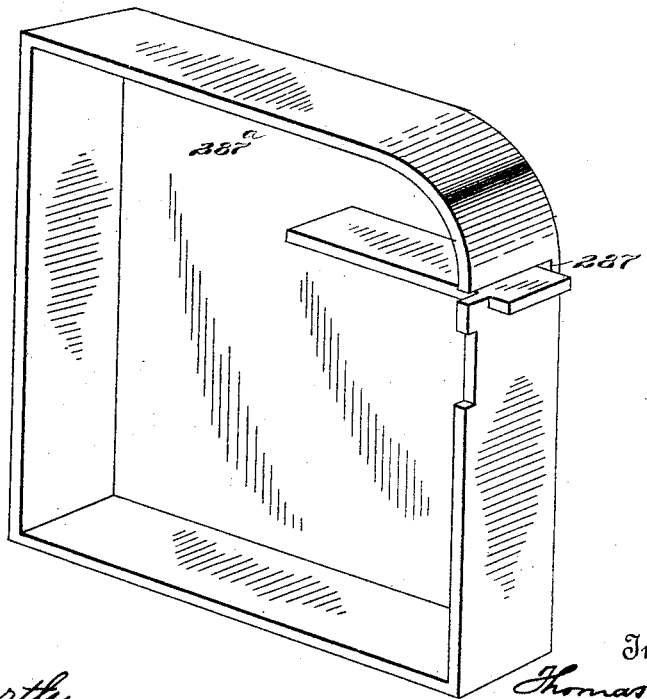

In the appended drawings, forming part of this specification, Figure 1 represents a vertical transverse section, partly broken away, of the devices embodying my invention, taken on the line $w$ $w$ of Fig. 6, hereinafter described, the cabinet for said devices being removed. Fig. 2 represents a similar view taken on the line $x$ $x$ of Fig. 6. Fig. 3 represents an end elevation of my said improvements, the cash-drawers being omitted and the upper portion of the machine broken away. Fig. 4 represents a view similar to Fig. 2, but taken on the line $y$ $y$ of Fig. 6 and looking toward the opposite end of the machine. Fig. 5 represents a view similar to Fig. 4, but taken on the line $z$ $z$ of Fig. 6. Fig. 6 represents a top plan view of my said improvements. Fig. 7 represents an enlarged detail front elevation of the counter, counter-cam, and throw-out device, some of the parts being omitted for clearness. Fig. 8 represents an enlarged detail side elevation of the full-stroke ratchet wheel and pawl. Fig. 9 represents an enlarged detail side elevation of the pivoted counter-frame and counter-throwing cam, the former being broken away. Fig. 10 represents a detail side elevation of the cam-arms that coöperate with the special-transaction keys and one of said keys. Fig. 11 represents a vertical transverse section, partly broken away, through the duplicate cash-drawers, a special clerk's key coöperating with the latch of one of the same being shown in side elevation. Fig. 12 represents a detail perspective view, partly broken away, of the indicator-supporting slide and coöperating parts. Fig. 13 represents an enlarged detail rear elevation of a number of the pivoted key-stops, showing the end of a key elevated between two of the same. Fig. 14 represents a detail top plan view, partly broken away, of the indicator guide-plate. Fig. 15 represents an enlarged detail perspective view of the coupling-slide for the platen-arms. Fig. 16 represents an enlarged detail perspective view of the counter removed from the machine. Fig. 17 represents a detail perspective view of one of the registering-frames, showing the latch-frame coöperating therewith, the shaft upon which it is fast, and the segmental gear carried by said shaft. Fig. 18 represents a side elevation of one of the counter-wheels, showing its pawl connection with the shaft upon which it is mounted. Fig. 19 represents a detail perspective view of the shafts and sleeves supporting the operating-pawls for the special counters. Fig. 20 represents a detail perspective view of the special clerk's keys and the locking-yoke which they operate. Fig. 21 represents an enlarged detail perspective view of the printer-hood, and Fig. 22 represents an enlarged detail perspective view of the devices for bringing the turn to zero mechanism to a full stop at the zero position.

In general terms this machine may be described as being a key-operated cash-register in which the keys are arranged in banks or groups, each of which coöperates with a movable registering frame common to all of the keys of said particular group. These frames are arranged to be moved variable distances, according to the values of the keys operated, and thus impart movements to a counter which is arranged to be moved into and out of mesh with racks carried by said frames. The aforesaid keys are also adapted to elevate suitable indicators arranged at the rear of the machine to indicate the amounts registered upon the counter.

Described in detail and as shown in the aforesaid drawings, 1 represents the frame of the machine; 2, the amount-keys; 3, the special-transaction keys, and 4 the indicators.

The amount-keys 2, as shown in Fig. 6, are arranged in four banks, three of which have nine keys each, while the remaining bank has only three keys. The keys of each of the three first-mentioned banks are numbered from "1" to "9," and said banks respectively represent units of cents, tens of cents, and units of dollars. The fourth bank represents tens of dollars and contains only three keys, which represent, respectively, ten, twenty, and thirty dollars. The said amount-keys, as shown in Fig. 1, are journaled upon a transverse shaft 6 and are formed near their rear ends with vertical operating-plates 7, having slots 8 and 9, Fig. 4, formed therein and hereinafter more fully described.

The indicators 4 are of the tablet or flag variety, and each comprises a tablet having the designating-numeral and a supporting-shank 10, preferably formed integral therewith. These shanks are mounted in apertured guiding-plates 11 and 12, suitably secured on the main frame, and are formed, respectively, with supporting-lips 13, which normally rest upon said plate 12, as clearly shown in Fig. 1. It will be seen by reference to Fig. 6 that the indicators are arranged in two parallel rows and that they lap one over the other, as shown. This construction permits a larger indicator being used than would be possible if the indicators were parallel with the transverse shafts of the machine in the usual manner. The lower ends of the aforesaid shanks 10 terminate above the rear ends of the keys 2, whereby when the latter are operated their respective indicators will be thereby elevated into exposed positions. In order to hold the operated indicators in their exposed positions when the keys return to normal, I provide a supporting-slide 14. This slide is mounted in the main frame so as to extend between the two rows of shanks 10 and is formed at its upper edge with spaced horizontal supporting-lugs 15, every alternate one of which extends forward, the remainder extending rearward. (See Figs. 1 and 12.) When the slide 14 is in its normal position, the lugs 15 extend into the paths of the lips 13 of the two rows of indicators, and thus support any indicators that have been elevated in their exposed positions. The said slide is held in its normal position by a coil-spring 16, which is mounted in parallel slots 17, formed in one end of said slide, and bears against a portion of the main frame and the end walls of said slots, as better shown in Fig. 12. The opposite end of said slide from that containing the slots 17 is beveled, as at 18, said beveled portion being engaged by a pivoted lever 19, journaled upon a transverse shaft 20. (See Fig. 4.) The rear end of the lever is normally held elevated against a stop-pin 21 and out of contact with the walls 18 by a coiled spring 22, which connects it to the main frame. The forward downwardly-turned end of said lever 19 engages a cam 23 fast to a rotation-shaft 64, which is actuated upon each operation of the keys, as hereinafter described. The formation of the cam 23 is such that the lever 19 will be operated to engage the bevel 18 and move the slide 14 upon the initial movement of a key, so that the lugs 15 will be moved out of alinement with the lips 13. The indicators that have been previously set will now drop and the new indicators will be permitted to rise as the lips 13 are free to pass between the lugs 15. As the key approaches the end of its own downstroke the lever 19 is allowed to return to normal position, which action also permits the slide 14 to return to normal position, and thus support the operated indicators in exposed positions and prevent the unoperated indicators from being raised.

Each of the special keys 3 for "paid out," "charge," "received on account," and "no sale" transactions is similar to the amount-keys, except that the slots 9 in the plates 7 are omitted and said keys are arranged to operate between registering frames herein described instead of coöperating with said frames as the cash-keys do.

By reference to Figs. 1 and 6 of the drawings it will be seen that the indicators 193 for the special-transaction keys are Y-shaped and are adapted to be raised outside of the regular indicators and their flash 194, hereinafter described. The special indicators are elevated in substantially the same manner as the regular indicators by the special keys with which they coöperate and when so elevated indicate both at the back and at the front of the machine.

As it is necessary in machines of the class to which the present invention belongs to prevent the simultaneous operation of more than one key in the same bank, I provide a series of pendent key-stops or hangers 26, having beveled lower ends and so mounted above the rearwardly-projecting ends of the keys that only one of the latter may be forced up between them at a time, which construction is well known in the art and needs no further explanation here. (See Fig. 13.)

The above description fully covers the relative operations of the keys and the indicators, and I will now pass on to the description of the operation of said keys in connection with the registering device or totalizing counter. Each of said amount-keys, as before stated, is formed with an operating-plate 7, having a cam-slot 9, said plates being guided in their movements by spaced fingers 25, formed on the plate 12, and also by a slotted guide-plate 290, mounted on the frame so as to receive the rearwardly-projecting ends of the keys. Each of the said cam-slots 9, as shown in Fig. 2, comprises two portions—namely, an inclined cam portion 27 and a free-play portion 28, concentric to the shaft 6, upon which the keys are journaled. The cam portions 27 are arranged at different angles, according to the values of the keys, and are adapted to receive bars 29 of registering frames 30, which are mounted, one fast and the other three loose, upon the aforesaid shaft 20. Each of these frames comprises, besides the said bar 29, two spaced arms 31 and a connecting tie or yoke 32, which latter braces the frame to secure the desired rigidity of the same, Fig. 6.

It will be seen from the above that when a key is operated the walls of its slot 9 engage the bar 29 of its respective registering frame, and thus rock the frame to a degree corresponding to the value of the key. When the walls of the concentric or free-play portion 28 of the slot strikes the bar 29, the movement of the latter ceases, and the frame 30 remains locked against movement in either direction during the time that said bar remains in this portion of the slot. This peculiar construction of the slots 9 also prevents any overthrow of the frames 30 by violent movements of the keys, as the said frames become locked to the keys just as soon as the rods 29 enter the slots 9. It will be seen by reference to Fig. 1 that the normal positions of the frames 30 are such that the bars 29 lie partly out of the mouths of the slots 9 and against the forward walls of the same. To return the bars to this normal position after the frames have been operated, I provide a series of bell-crank levers 129$^a$, one for each frame and pivoted upon a transverse shaft 130$^a$. (See Fig. 1.) One arm of each of said levers engages the key-coupler 111, hereinafter described, while the remaining arm is formed with a cam extension 131$^a$, which coöperates with its respective bar 29. Upon the return of the keys and the consequent final downward movement of the key-coupler all of said levers 129$^a$ are given the additional movement; which causes their cam extensions to engage and force the rods 29 forward to normal position and partly out of the slots 9, the walls of which have been previously moving said rods. Each of the rods 29 projects slightly beyond one end of its frame, so as to coöperate with one of a series of latch-arms 33, as shown in Fig. 1. As these latch-arms are similar in the several banks I will describe one only, as such description will suffice for all. Each of said arms is of angular formation and, together with an arm 34 and a connecting-bar 35, (see Fig. 17,) forms a latch-frame 39, which is journaled upon a transverse shaft 36. A coiled spring 37 surrounds this shaft and is connected at one end to the same, so that its free end will bear against the arm 34 to normally hold the frame forward with the latching-arm 33 in the path of the projecting end of the rod 29, which effectually locks the frame 30 against any rocking movement. When a key is operated, its respective latch-frame 39 is rocked against the tension of its spring to move the arm 33 out of the path of the projecting end of the bar 29 by the inclined rear edge 40 of the plate 7 of said operated key, which engages and forces the bar 35 rearward. When the key returns to normal position, the frame 39 again swings forward under the impulse of its spring and the respective frame 30 again becomes locked by the arm 33.

Each frame 30 is provided with a segmental rack 41, those of the two right-hand frames being formed on their adjoining ends, while that of the next adjoining frame is fast upon the shaft 20 to which said frame is also fast. The extreme left-hand frame is loose upon the shaft 20 and is formed with a segmental rack 42. (Better shown in Fig. 6.) This rack meshes with a pinion 160, mounted on a short transverse shaft 161, which also carries a similar pinion 162. This latter pinion meshes with the fourth rack 41, which is journaled upon the shaft 20. As the respective frames 30 are moved distances corresponding to the values of the operated keys their racks are also similarly moved and when meshing with the counter-pinions impart said movements to the counter-wheels.

The counter as shown in Figs. 1 and 16 comprises a frame 43, which is pivotally mounted on a shaft 44, which is in turn mounted in the main frame. Said frame 43 forms a support for a transverse shaft 45, upon which the counter-wheels 46 are journaled. Each of the first four counter-wheels which are arranged to be operated directly from the racks 41 is provided with a pinion 47, said pinions being arranged to mesh with the racks only when the counter-frame is thrown forward. Each of the counter-wheels is provided with a ratchet-wheel 48 and a transfer tripping-pin or stud 49. After a counter-wheel has made a complete revolution, which equals one unit of the next higher wheel, its stud 49 engages the beveled end of one of a series of pivoted supporting-pawls 50 and forces the same back against the tension of a coiled spring 51, which connects a rearwardly-extending arm 52 formed on the same to one of a series of transfer-pawls 53. Each of these pawls is pivoted in a groove 55, formed in one of a series of pivoted levers 54, which latter are pivotally mounted in the counter-frame upon a transverse shaft 56. Each of the said pawls 53 is formed with a nose 57, a hook 58, and a stud or lug 59. When the pawls 50 are in their normal positions, the said pins 59 rest upon shoulders 60, formed on said pawls, and thus hold the pawls 53 so elevated that they will not engage the ratchet-wheels 48 when the levers 54 are moved forward, as hereinafter described; but when the pawls 50 are tripped or forced forward as above described the shoulders 60 will pass from under the pins 59, so that the pawls 53 will drop to such a position that they will engage and actuate the ratchet-wheels when the levers 54 are operated. The pawls 53 when released are drawn downward by the coiled springs 51; but if they should move downward too slow or by any means become stuck in their elevated positions they are positively forced downward by the arms 52 engaging the hooks 58 upon the tripping of the pawls 50. When a lever 54 is operated after its respective pawl 53 has been tripped, the pawl engages its ratchet-wheel 48 and as it moves rearward the front end of said pawl is of course elevated until the pawl 50 again snaps under the pin 59, said pawl 50 being drawn forward by its spring 51 after it is relieved of the pressure of the transfer-stud on the counter-wheel. As the pawl 53 makes its final movement toward the counter the nose 57 becomes seated in the bottom of the groove 55, in which the pawl is pivoted, and thus prevents any further elevation of the rear end of the pawl, such as would be caused by any overthrow movement of the counter-wheel, which would force an extra ratchet-tooth under said pawl. The relative arrangement of the parts is of course such that a pawl 50 is tripped by the movement of one counter-wheel, while the transfer-pawl 53, which is released thereby, coöperates with the ratchet-wheel of the next higher counter-wheel. As it sometimes occurs that a transfer will be caused by or follow a transfer during a single operation of the machine, it becomes necessary to operate the transfer-pawls 53 successively, so that the transfer operations will follow each other in rapid succession across the entire counter. Such successive movements of the pawls from right to left are effected by the successive movements of the operating-levers 54, each of which is provided with an operating-arm 61, carrying an antifriction-roller 62 at its lower end. These rollers are arranged to be struck and forced rearward successively by a series of cam-arms 63, fast to a rotation-shaft 64, hereinafter described. (See Fig. 1.) The levers 54 are returned to their normal positions after being forced rearward by coiled springs 65, mounted in sockets formed in the counter-frame and engaging the rear edges of said levers. The counter-frame further carries a series of spring-pressed plungers 66, which engage a series of pivoted pawls 67, also pivoted in the frame, to force the same rearward into engagement with the counter ratchet-wheels to prevent any retrograde movement of the same. When it is desirable to turn the counter-wheels to the zero position, the shaft 45 is rotated to cause the walls of a groove 68 formed therein to engage spring-pressed pawls 69, mounted on the respective counter-wheels, and thus carry said wheels with the shaft until the zero position is reached. (See Fig. 18.)

The rotation of the shaft 45 is effected by a beveled pinion 70, fast to one end of the same, as shown in Fig. 7, and meshing with a similar pinion 71, fast to a short vertical shaft 72, mounted in the counter-frame. This shaft is formed in its top with a suitable key-notch for the insertion of a key for rotating it. The opposite end of the shaft 45 from that provided with the pinion carries a cam-disk 73, having a notch 74 and a pin 75, as shown in Fig. 5. When the shaft is in normal position, as shown in this figure, one end of a pivoted pawl 76 rests in the notch 74, the opposite end of said lever being provided with a pin 77, which projects into a slot 78, formed in a crank-arm 79. This arm is fast to a rock-shaft 80, mounted in the counter-frame, so that when said arm is moved the shaft will be simultaneously rocked. The movement of the arm is effected upon the initial movement of the cam 73 as such movement forces the end of the pawl 76 out of the notch 74. The cam 73 is further formed with a tooth 81, located in proximity to the notch 74 and adapted after the initial movement of the cam to prevent a return movement of the same by coöperating with a tooth 82, formed on the pawl 76, or with the end of the pawl itself. This construction prevents the counter-wheels being turned partly forward and the cam then turned backward to allow the pawl 76 to again become seated in the notch 74, and thus compels a full forward movement of the cam after its rotation has once been commenced. In order to arrest the shaft 45 when the counter-wheels have reached zero position, I provide a pivoted notched pawl 83, formed with a stop-lug 84. (See Figs. 5 and 22.) A coiled spring 85 is interposed between this lug and a shoulder 86, formed on the pawl 76. It will be observed that when the parts are in the position shown in Fig. 5 the notched end of the pawl 83 lies out of the path of the pin 75, and the cam 73 is thus free to move with the shaft 45. Upon the initial movement of the cam, as above described, the forward end of the pawl 76 is raised, which operation causes the shoulder 86 to engage the lug 84 and rock the pawl 83 to bring its notched end into the path of the pin 75. When the pin reaches the pawl, it enters the notched end of the same, and thus prevents said pawl snapping back to normal position when the pawl 76 enters the notch 74 and releases the lug 84.

Just as soon, however, as the pressure upon the shaft 45 is relaxed the spring 85 forces the pawl 83 out of engagement with the pin 75. As before stated, the operation of turning the counter to zero rocks the shaft 80, which action locks the machine against operation and prevents the tripping of any of the pawls 50. To effect the first-mentioned result, said shaft, as shown in Fig. 9, is provided with a slotted crank-arm 87, into the slot of which projects a pin 88, mounted on a bell-crank latch-lever 89, pivoted on the counter-frame. This lever is formed at its lower end with a latching-hook 90, which when the shaft 80 is rocked enters a notch 91, formed in a disk 92, mounted on the shaft 64, and thus locks the shaft 64 against forward movement until the shaft 80 again returns to normal position, as above described. To accomplish the second result, the said shaft 80 is provided with a wing 93, the rear edge of which when the shaft is in normal position acts as a stop for all of the levers 54, as shown in Fig. 1. When the shaft 80 is rocked, as above described, the wing 93 is also rocked, so that its rear edge is moved forward and up and its forward edge rearward and down. This forward edge contacts with the arm 61, and so rocks the levers 54 on their pivots that the pawls 53, and consequently the pawls 50, are moved far enough forward for the latter to escape being struck by the trip lugs or pins 49 on the counter-wheels. The shaft 80 is rocked back to normal position when the counter-wheels reach zero by a coil-spring 94, which connects a lug formed on said wing to the counter-frame, for which see Fig. 7. The aforesaid shaft 64 also carries a cam 95, which is arranged to coöperate with a bevel-ended arm 96, formed on a yoke 97, which is journaled on the shaft 56. (See Fig. 1.) This yoke is adapted to coact with pins 98, mounted on the respective levers 54. The construction of the cam 95 is such that upon the initial movement of the same the arm 96 is forced rearward, and thus rocks the yoke 97 and brings it into contact with the pins 98. This action secures the return of any of the levers 54 which may have been previously operated and not properly returned to normal positions by their respective springs 65. As the movement continues the arm 96 rides upon the periphery of the cam 95, and thus holds the levers 54 against any accidental movement during the time that motion is being imparted to the counter-wheels by the racks 41. Just as the counter-frame is moved back to disengage the counter-pinions from the racks 41 the reduced portion of the cam 95 is reached, and the arm 96 is left free to be rocked forward, which operation releases all of the levers 54 and leaves them free to effect the transfer. The above-mentioned movement of the counter-frame 43 to engage and disengage the counter-pinions from the racks 41 is secured through the medium of the disk 92, which is formed with a cam-groove 99, into which projects an antifriction-roller 100, mounted on a pendent portion of the counter-frame. (See Figs. 7 and 9.) The formation of the cam-groove 99 is such that the counter-frame is rocked rearward when the racks 41 are moving downward and is moved back again to normal position before the return movements of the racks have commenced. As it is desirable to prevent the counter from being thrown rearward into operative position when any one of the special-transaction keys is operated, I mount the disk 92 loosely upon the shaft 64 and provide the same with a clutch-sleeve 169, formed with a notch 170 for the reception of a flange 171, formed on a companion clutch-sleeve 172. This latter sleeve is feathered upon the shaft 64, so as to rotate therewith, but be capable of longitudinal movement thereon. The sleeve 172 is normally forced forward into engagement with the sleeve 169 by a coil-spring 173, mounted upon the shaft 64 between said sleeve 172 and a collar 174, fast to said shaft. The sleeve 172 is formed with an annular groove 175, which receives the yoke end of an arm 176, fast to a longitudinally-movable shaft 177. Said shaft 177 extends above the keys, as shown in Figs. 1 and 7, and is provided with a series of pendent cam-arms 178, projecting down beside the special-transaction keys and into the paths of pins 179, mounted thereon. When one of said special keys 3 is depressed, its pin 179 engages its respective cam-arm 178 and forces the same laterally, thus moving the shaft 177 correspondingly. This movement of the shaft moves the sleeve 172 against the tension of its spring and uncouples the clutch, so that when the shaft 64 is rotated the disk 92 will not be actuated and the counter will remain in inoperative position. The said shaft 64 receives its rotary motion through the medium of a reciprocating rack-bar 101, having rack-teeth formed on its opposite edges and a guiding-slot 102 formed in its lower end, as best shown in Fig. 4. A pin 103, mounted on the main frame, projects through this slot, and thus forms both a guide and a fulcrum for said rack. The upper end of the rack is shifted laterally to bring the respective sets of rack-teeth alternately into engagement with pinions 104 and 105 by a coil-spring 106, connecting said rack-bar to the frame. When the rack-bar is in its upper normal position, (shown in Fig. 4,) the spring 106 exerts its tension above the fulcrum-pin 103, and the upper end of the rack is thus drawn forward into mesh with the pinion 105; but when the rack-bar is moved to its lower position the tension of said spring is applied below the fulcrum 103, and the upper end of the rack-bar is thus drawn into mesh with the pinion 104, which is fast to the shaft 64. Motion is transferred from the pinion 105 to the pinion 104, so that the latter is continuously rotated in one direction by an intermediate idle pinion 291, journaled on the main frame, said pinions 104 and 105 being of sufficient width to mesh with the rack-bar and this pinion 291, which operates beside said bar. In order to hold the rack-bar in mesh with the proper pinion during its full stroke in either direction, I provide said bar with a lug 107, which is arranged to be guided by and to pass from one side to the other of a rigid flange 108, formed on the main frame, when the bar reaches its upper or lower extremity of movement. The flange 108 is preferably beveled at its upper and lower ends, so that if the lug 107 should strike either one of said ends in its vertical movements it will be forced to slip down beside the flange. A stud 109 is mounted on the main frame to limit the upward movement of the rack-bar. Said rack-bar receives its vertical movements through an arm 110, mounted fast upon the key-coupler 111 and carrying an antifriction-roller 112, which projects into an elongated slot 113, formed in said rack-bar. The key-coupler is operated when any one of the keys is depressed, and thus the rack-bar is reciprocated upon each operation of the machine. The said key-coupler, which extends across all of the keys, is journaled to the rear of the shaft 6, so that when a key is operated a flange 115, formed on said coupler, will enter the aforesaid slots 8 of the operated keys, and thus couple the same together in a manner well known in the art. In addition to this regular coupling action of the key-coupler I also provide for coupling the amount-keys and the special-transaction keys successively to the coupler and then elevating or operating the coupler by any one of a series of clerks' initial keys 163. To accomplish this result, I provide each of said amount and special-transaction keys with a pivoted spring-pressed pawl 164, so located as to coöperate with the key-coupler flange. When one of the above-mentioned keys is given its initial movement, it elevates the coupler and causes its flange to pass under the pawl 164, mounted on said key, to prevent the return of the key when pressure is removed from the same. When in this position, however, the flange 115 has not passed into the notch 8, but the key is simply supported by its pawl. Should a second key be now operated, its pawl 164 will be depressed by engagement with the key-coupler flange until it has passed the latter, when it will snap forward again over said flange, and thereby couple the key to the coupler. The aforesaid initial movement of the key-coupler is limited in the following manner: The arm 110, which moves with said coupler, (see Fig. 4,) is provided with a pin or stud 165, which is arranged to contact with an arm or stop 166, mounted on a rock-frame 167. This frame is of yoke formation and is pivoted upon the shaft 6 so as to extend under all of the keys 163 and is normally held up in contact with these letter-keys by a coil-spring 168, connected to said rock-frame and the main frame. It will be seen from the above that the arm 166 normally lies in the path of the stud 165, so as to limit the initial movement of the coupler, and consequently the initial movement of the amount and special-transaction keys. When, however, one of the keys 163 is operated, it contacts with the frame 167 and rocks the latter, which operation moves the arm 166 forward out of the path of the pin 165, and thus permits the said key 163 to make its full stroke, carrying the key-coupler and keys coupled thereto with it. By this means any of the amount or special-transaction keys desired may be partially operated and coupled to the key-coupler and the latter then operated by a clerk's key to complete the operation. The means for preventing the key-coupler from sinking back to its normal position after it has made its initial stroke are as follows: The shaft 64, as shown in Figs. 7 and 8, is provided with a ratchet-wheel 116, having its teeth omitted at diametrically opposite positions, as at 117. A spring-pressed pawl 118, mounted on the main frame, engages the said ratchet-wheel to prevent any retrograde movement of the shaft 64. When the said pawl is engaging one or the other of the toothless portions 117 of the ratchet, as it does at the terminations of the opposite strokes of the keys, the shaft 64 may be moved back slightly. This structure is to permit a slight free play of the shaft 64 at these periods to secure correct meshing of the teeth on the rack-bar with the pinions 104 and 105 as said rack-bar is shifted from one to the other. As the rapid rotary movement of the shaft 64 has a tendency to overthrow the same during the time the rack-bar is shifting from one pinion to the other, I provide means for overcoming this defect. This means, as shown in Fig. 5, comprises a disk 119, secured to said shaft 64 and formed with a notch 120, and a lever 121, journaled on the shaft 6. This lever 121 is formed with three arms 122, 123, and 124, the two former being in turn formed with locking and alining noses 125 and 126.

The arm 122 further carries an antifriction-roller 127, which is held down upon the top of the key-coupler by a coiled spring 128, which connects the arm 124 to the main frame. When the key-coupler is moved up upon the operation of a key, the lever 121 is of course rocked, so as to disengage the nose 126 from the notch 120 and cause the nose 125 to enter the said notch as the disk 119 completes its half-revolution, and thus properly aline and arrest the shaft 64 at the end of the downstroke of the keys. When the coupler again descends under the impulse of the spring 128, the nose 126 enters the notch 120, as shown in Fig. 5, and alines and arrests the shaft at the termination of the upstrokes of the keys. It will be observed from the foregoing that the spring 128 subserves the double purpose of operating the lever 121 and through said lever returning the key-coupler to normal position.

The plates 7 of the special keys 3, as before stated, are not formed with the slots 9, but play between the respective rock-frames 30, with which the remaining keys coöperate. The registering operations of said frames 30 is therefore not effected in any way by said special keys; but a separate record of the number of operations of the same is provided for as follows: Each of said special keys is provided with two spaced pins 129, (see Fig. 1,) between which projects one of a series of pendent cam-arms 130. These arms are mounted, respectively, upon two transverse shafts 131 and two sleeves 132, mounted on said shafts, as better shown in Figs. 1 and 6, so that when one of said keys is operated its respective shaft or sleeve will be rocked. Each of said shafts and each of the sleeves is provided with an arm 133, carrying a spring-pressed pawl 134, (see Fig. 1,) which coöperates with one of a series of counters 135 to turn the same forward one number upon each operation of said pawl in a manner well known in the art and needing no further explanation here. All of the counter-wheels of the special counters are mounted upon a common shaft 143 and are arranged to be "picked up" and returned to zero by said shaft in the same manner as the counter-wheels of the totalizing-counter. The end of the shaft 143 is provided with a bevel-pinion 144, which meshes with a similar pinion 145, journaled on the main frame and formed with a key-aperture for the reception of a suitable operating-key, (see Fig. 6,) all of which is well known in the art and needs no further explanation. The counter-wheels of the respective special counters are prevented from moving backward by a series of spring-pressed restraining-pawls 136, mounted on the main frame. It will be observed that by the above-described devices each of the said special counters is advanced one numeral when its respective special key is operated, and a record is thus left of the exact number of times each special key is operated.

In addition to the special-key counters I also provide a customer-counter 180 (see Fig. 6) and operate it in substantially the same manner as the above-mentioned special counters, with the exception that its operating-arm 181, (see Fig. 1,) which is spring-drawn, is actuated by a cam 182, fast to the rotation-shaft 64.

Having thus described the construction and operation of the registering and indicating devices, I will pass on to a description of the duplicate cash-drawers 1ª and their coöperation with the special clerks' keys 163. These drawers, as shown in Fig. 11, are arranged one above the other and are of a number equal to the number of clerks' keys, so that each clerk may have a separate cash-drawer. Each drawer is mounted in the cabinet in any suitable manner and is arranged to be forced open when released by a spring located behind it in a manner well known in the art. The drawers are held in their closed positions by latch-plates 183, fast to the rear sides of the same and coöperating with latch-plungers 184, suitably mounted in the main frame and normally forced down into latching position by coil-springs 185, interposed between their upper ends and the main frame. Each of said plungers is formed at its upper end with a vertical slot for the reception of the rear end of its respective clerk's key. The plunger of a certain key, however, is not raised until the final downward movement of the key, which causes its rear end to strike the upper wall of the slot formed in the plunger, and thereby raise the latter. In order to prevent a drawer being opened without first operating some one of the keys 2 or 3, I provide a rock-shaft 186 and mount a number of hook-arms 187 fast thereon in such positions as to engage pins 188, mounted on said clerks' keys, as shown in Fig. 11. The arms are normally held in the position shown in said figure by a spring 189, connecting one of a series of arms 190, mounted on the shaft 186, to the main frame. The arms 190 are formed with bevel-faced notches 191, which engage pins 192, mounted on the amount-keys and the special-transaction keys. When an amount or special-transaction key is operated, its pin 192 forces its arm 190 backward, and thus rocks the shaft 186, which operation disengages all the arms 187 from the pins 188 and leaves the clerks' keys free to be operated.

In the particular class of machines embraced by my invention it is very desirable that the regular indicators should not be exposed to view until the operated key has returned to normal position, and to accomplish this result I provide the guard or flash 194. This guard, as shown in Figs. 1 and 6, is arranged to extend about said indicators, whereby when it is raised it will conceal both sides of the same. The guard is supported in position at its opposite ends by pendent guide-bars 195, which are suitably mounted in the main frame and are provided at their lower ends with pins 196, which project into slots 197, formed in levers 198. (See Fig. 2.) These levers are journaled upon the shaft 6 near its opposite ends and are in turn formed with slots 199 for the reception of studs 200, mounted on the opposite ends of the key-coupler. By this means the operation or elevation of the coupler will also raise the levers 198 and with them the guard or flash, which latter will remain in position to conceal the indicators as long as said coupler remains elevated.

By reference to Fig. 2 it will be seen that I have provided a bell 143 and arranged to sound the same upon each operation of the machine through the medium of the rotation-shaft 64. This shaft carries a cam 144, which coöperates with a nose 145, formed on a pivoted bell-clapper 146, which is arranged to be normally drawn toward the bell by a coil-spring 147, which connects it to the main frame. The lower end of the bell-clapper is engaged by a pin 148, mounted on a suitable lock-disk 149, controlled from the exterior of the machine by a suitable key. By rotating this lock-disk the clapper may be so limited in its movements by the said pin 148 that it cannot engage and sound the bell when vibrated by the cam 144.

By reference to Fig. 5 it will be seen that the uppermost cash-drawer coöperates with a hook 201, formed on a slide 202, which is formed with guiding-slots 203, through which project the shafts 6 and 130ª. A coil-spring 204 normally draws the slide forward to cause a hook 205 formed thereon to project over the key-coupler flange, and thus prevent the operation of the machine as long as the uppermost cash-drawer remains open. When said drawer is closed, the slide is forced rearward and the hook 205 moved out of the path of the key-coupler flange to leave the key-coupler free for operation. The slide 202 is further formed with a notch 206, into which projects a pin 207, formed on the lower end of a pivoted lever 208, mounted on the main frame. It will be observed that by operating this lever the slide may be forced rearward out of operative position independent of the cash-drawer, and thus permit the machine to be operated with the upper cash-drawer either open or closed, as desired.

The aforegoing description relates exclusively to the indicating and registering devices, and I will now pass on to the description of the printing mechanism. The printing-wheels 210 of this mechanism (see Fig. 6) represent, respectively, the four banks of amount-keys, the clerks' keys, and the special-transaction keys. Said wheels are mounted upon the outer ends of nested sleeves 211, 212, and 213 and a transverse shaft 214, suitably mounted in the main frame. Each of the three sleeves 211 and the shaft 214 is provided at its inner end with a pinion 215, which is in permanent mesh with its respective segmental rack 41 or 42, so as to receive the graduated movements therefrom, as better shown in Fig. 1. The rock-frame 216 for the clerks' keys is substantially the same in construction and operation as the regular registering frames 30 and carries a segmental rack 217, (see Figs. 6,) which meshes with a pinion 218, carried by the sleeve 212. The sleeve 213, as best seen in Figs. 4 and 6, carries a pinion 219, with which meshes a rack-bar 220, pivotally mounted upon a lever 221 and held down to such mesh by a guide-wheel 222, mounted on the main frame. The said lever 221 is fast upon a transverse rock-shaft 223, which, as better shown in Figs. 5 and 10, is provided with a series of arms 224, having cam-slots formed therein for the reception of pins 225, mounted on the special-transaction keys. The cam-slots of the arms 224 are arranged in graduated order, whereby the several keys will rock the shaft 223 different distances, and thus move the rack-bar 220 correspondingly. This movement of the rack-bar will of course move the sleeve 213 and adjust the printing-wheel carried thereby to the proper position to print characters corresponding to the operated key. Each of the aforesaid printing-wheels is formed with duplicate sets of types arranged, respectively, upon opposite sides of the same, whereby duplicate impressions may be made from opposite sides of said wheels. Each of the type-wheels, as better shown in Fig. 3, is provided with a star-wheel 226, by means of which it is brought to the proper alinement and locked in the printing position. These star-wheels are arranged to be engaged by a series of alining pawls 227, independently mounted upon a transverse shaft 228 and formed each with a lug 229 and a slot 230. The shaft 228 also supports a pivoted yoke 231, provided with a cross-rod 232, which projects through the slots 230, and also with a series of coil-springs 233, the inner ends of which surround the lugs 229. By this structure when the yoke 231 is rocked forward the springs 233 are all put under tension to force the pawls independently into engagement with their respective star-wheels. When the yoke is rocked back again, the cross-rod 232 contacts with the rear walls of the slots 230, and thus moves the pawls back to their normal positions, in which they are shown in Fig. 3. The rocking of the yoke is accomplished through the medium of a slotted arm 234, fast thereto and coöperating with a pin 235, mounted on a lever 236. This lever is suitably pivoted on the main frame and is normally drawn forward by a coil-spring 237, which connects it with said main frame. The lever is further formed with a lug 238, which is arranged to be struck by an arm 239, fast to the extended journal end of the key-coupler. The arm 239 is further formed with an extension 240, which carries a spring-drawn pawl 241. This pawl is formed with a hook end 242 and a cam-shoulder 243. When the pawl 241 is drawn down, the hook 242 engages a lug 244, mounted on a pivoted platen-arm 245, and thus draws said arm down against the tension of a spring 246, which connects it with the upper pivoted platen-arm 949. As the said pawl descends the cam-shoulder 243 engages a pin 247, mounted on the frame, and thus disengages the hook 242 from the lug 244 and allows the platen-arm to fly back under the impulse of its spring to cause the flexible platen 248, carried thereby, to be forced upward against the printing-wheels from below.

The two platen-arms 245 and 249 are coupled, so as to move together, in the following manner: The arm 245 is formed with a vertical extension 250, having a slot 251 formed therein, while the arm 249 is provided with a pendent extension 252, having a slot 253 formed therein. A coupling-plate 254 (better shown in Fig. 15) is formed with a guiding-slot 255, a square lug 256, and two studs 257 and 258, arranged upon opposite sides of the same, and is adapted to couple the two platen-levers, so that they will move together. The said plate is guided, as shown in Fig. 3, by the projecting end of the journal of the lever 249, which projects into the slot 255, and also by the lug 256, which operates in the slot 253. The plate is arranged to be slid vertically to bring the stud 257 into the slot 251 by a key 259, having a slot 260, into which the stud 258 projects. When the devices are in the normal position, (shown in Fig. 3,) the pin 257 lies out of the slot 251, and the lower platen will be operated without affecting the upper platen; but when the slidable plate 254 is depressed, as above described, the pin is brought within the slot and the two platens move together. The said key 259 is provided with an operating-button 261 and is mounted to slide on the frame by pins 2$^a$, which project through slots 2$^b$, formed therein. The key is normally drawn into its upper position by a coil-spring 262, which connects it to the main frame, and is formed with a notch 263, arranged to receive a retaining-pawl 264. This pawl is pivoted on the main frame and is normally drawn into engagement with the key 259 by a coil-spring 265, which connects it to said frame. When the key 259 is depressed to couple the platen-levers, the pawl 264 enters the notch 263 and holds the key in this position until the final movement of the machine, when a cam 266, mounted on the shaft of the pinion 105, (see Figs. 3 and 4,) engages and operates an arm 267, fast to the shaft carrying said pawl.

It is often desirable to print a character upon the detail-strip whenever a check has been printed, and to accomplish this result I have provided the following means: Pivoted upon the frame is a spring-drawn pawl 210$^a$, bearing a type at one end which is normally out of the path of the lower platen. The other end of said pawl extends above the type-wheels and is adapted when the platens are coupled to be struck by the upper platen and force the type end of said pawl in engagement with the lower platen to print upon the detail-strip in alinement with the amount any suitable characters.

The platen-arms 245 and 249 are held in their normal positions (shown in Fig. 3) by two spring-pressed plungers 268, mounted on the main frame and engaging the respective extensions of said platen-arms.

An endless inking-ribbon 269 passes about the type-wheels and is supported in position by guide-studs 270, a feeding and inking roller 271, and a tension-roller 272. The roller 271 is covered with ink-saturated felt and is provided with a gear-wheel 273, by means of which it is rotated to feed the ribbon at each operation of the machine. The tension-roller 272 for holding the ribbon taut at all times is mounted upon a pivoted arm 274, which in turn carries a pivoted arm 275, having a cam end and connected to the first-mentioned arm by a coil-spring 276. The cam end of the arm 275 rests against one of the studs 270, and the two arms form, in effect, a toggle which the spring 276 is normally seeking to draw together, and thus keep the inking-ribbon under tension.

The detail-strip 278 is wound upon a supply-roll 279 and passes from the same over two guiding-studs 280 and is wound upon a feeding-roller 281. This roller is provided with a ratchet-wheel 282 and a gear-wheel 283, the latter communicating motion to the gear 273 through an intermediate gear 284. The ratchet-wheel is moved one tooth upon each operation of the machine by a spring-pressed pawl 285, mounted on the lower platen-lever 245. Said ratchet-wheel is prevented from moving backward by a spring-pressed pawl 286, mounted on the main frame.

When a check is to be printed, the same is inserted under the upper platen through a suitable slot 287, formed in the printer-hood 287$^a$, as shown in Fig. 21, the platen-arm 249 being of an angular formation to allow of this operation, as shown in Fig. 6.

Having thus described my invention, what I claim as new, and desire to secure by Letters Patent, is—

1. In a cash-register the combination with a registering mechanism, of a movable member, a series of cash-keys arranged to be coupled to said member so as to be operated thereby, a series of special keys for operating said member, and locks for said special keys arranged to be operated by the cash-keys.

2. In a cash-register the combination with a registering mechanism, of a series of cash-keys, a member common to all of said keys, spring-pressed pawls mounted on the keys and adapted to couple the same to the common member, a series of special keys arranged to operate said common member and locks for the special keys operated by the cash-keys.

3. In a cash-register the combination with registering devices, of a series of cash-keys, a key-coupler, movable pawls mounted on said keys and adapted to couple the same to said coupler, upon their initial movements, a series of special keys arranged to be coupled to said coupler when operated and thus actuate the same to operate the cash-keys, and locks for the special keys operated by the cash-keys.

4. In a cash-register the combination with operating devices, of a printing mechanism, a platen, a pivoted arm carrying a type and arranged to be struck and operated by said platen and means for operating the platen at will.

5. In a cash-register the combination with operating devices, of a printing mechanism, two platen-arms, springs connecting said arms, spring-pressed plungers engaging said arms, a movable device for coupling the two arms, and a special key for operating said device.

6. In a cash-register the combination with operating devices, of a printing mechanism, two printing-platens one of which is connected to the operating devices, a slide for coupling said platens, and a special key for operating said slide.

7. In a cash-register the combination with a registering mechanism, of a series of cash-keys, a member common to all of said keys, movable means mounted on said keys for coupling the same to said member, a series of special keys for operating said member, and locks for said special keys arranged to be operated by the cash-keys.

8. In a cash-register the combination with a registering mechanism, of a counter, means for throwing said counter into connection with the registering mechanism, a clutch for governing said throwing means, a longitudinally-slidable shaft connected to said clutch, cam-arms mounted on said shaft, a series of cash-keys, a series of special keys and projections mounted on the special keys and arranged to engage and operate the cam-arms.

9. In a cash-register the combination with an operating mechanism, of a counter, a series of cash-keys, a normally locked member common to all of said keys, movable devices mounted on the amount-keys whereby they may be given an initial movement and thereby coupled to said member and a series of special keys arranged to unlock said member and operate the same.

10. In a cash-register the combination with registering devices, of a series of cash-keys, a member common to all of said keys and to which they are arranged to be successively coupled, a lock for said common member, a frame for operating said lock, and a series of special keys arranged to operate said frame and actuate the common member.

11. In a cash-register the combination with registering devices, of a series of cash-keys, a member common to all of said keys, movable latches on the keys arranged to couple the same to the common member, a series of special keys, a lock for the common member, and a frame for operating said lock arranged to be moved by any one of the special keys.

12. In a cash-register the combination with a registering mechanism, of a series of cash-keys, a key-coupler, a series of pivoted pawls mounted on said keys and arranged to couple the same to said coupler, a series of special keys arranged to operate said coupler, and a lock for said coupler arranged to be actuated upon the initial movement of said special keys.

13. In a cash-register the combination with an operating mechanism, of a counter, a series of cash-keys, a key-coupler, pawls mounted on said keys for coupling the same to the said coupler, a series of special-clerk's keys for operating said coupler, a series of special-transaction keys and means operated by these latter keys for preventing the operation of the counter.

14. In a cash-register the combination with a registering mechanism, of a series of cash-keys, a key-coupler, pawls mounted on said keys and arranged to couple the same to said coupler, a series of special keys arranged to operate said coupler, a printing device connected to the registering mechanism, a platen and means connected to the key-coupler for operating said platen.

15. In a cash-register the combination with a registering mechanism, of a movable member, a series of cash-keys arranged to be coupled to said member so as to be operated thereby, a lock for said member, a series of special keys, arranged to first operate said lock and then the common member, and locks for said special keys adapted to be operated by the cash-keys.

16. In a cash-register the combination with a registering mechanism, of a series of cash-keys, a counter, clutch-controlled means for throwing the counter into connection with the registering mechanism, a movable shaft for governing the operation of the throwing means, cam-arms mounted on said shaft, and a series of special keys carrying projections arranged to operate said cam-arms.

17. In a cash-register the combination with operating devices, of a printing mechanism, two platen-arms each formed with a coupling-slot, and one of the same connected to the operating devices, a coupling-slide having projections which coöperate with the slots of the platens and a special key for operating said slide.

18. In a cash-register the combination with operating devices, of a printing mechanism, two platen-arms one of which is connected to the operating devices, a coupling-slide for said arms, a slidable key for operating said slide, a latch arranged to hold the key in its depressed position and means connected to the movable parts of the machine for tripping said latch.

19. In a cash-register the combination with operating devices, of a printing mechanism, two platen-arms one of which is connected to the operating devices, spring-pressed plungers engaging said arms to normally force them away from the printing mechanism, a slide for coupling said arms, and a special key for operating said slide.

20. In a cash-register the combination with operating devices, of a series of printing-wheels, alining devices mounted on said printing-wheels, alining-pawls arranged to engage said devices, an arm for operating said pawls, a platen, a pawl for operating said platen, and means connected to the movable parts of the machine for operating said pawl and arm.

21. In a cash-register the combination with operating devices, of a printing mechanism arranged to print both a check and a detail-strip, a check-printing platen, and a printing-type arranged to be operated by said platen to print on the detail-strip.

22. In a cash-register the combination with operating devices, of a printing mechanism arranged to print both a check and a detail-strip, means for printing a check at will, and printing devices arranged to print on the detail-strip only when the check-printing devices are operated.

23. In a cash-register the combination with registering devices, of a series of cash-keys, a member common to all of said keys and to which they are arranged to be successively coupled, a lock for said common member and a series of special keys arranged to operate said lock and actuate the common member.

24. In a cash-register the combination with a registering mechanism, of a series of cash-keys having coupling-hooks formed thereon, a key-coupler so pivoted that when operated it will engage said coupling-hooks, independent movable coupling devices mounted on the keys and arranged to independently couple the same to the coupler before the regular coupling operation takes place, special keys for operating said coupler, and locks for the special keys arranged to be operated by the cash-keys.

25. In a cash-register the combination with a registering mechanism, of a counter, a cam for throwing the counter into connection with the registering mechanism, a clutch governing said cam, a movable shaft connected to said clutch, a series of cam-arms mounted on said shaft, and a series of keys arranged to operate said cam-arms to move the aforesaid shaft.

26. In a cash-register the combination with a registering mechanism, of a counter mounted on a pivoted frame, a cam for throwing said frame to bring the counter into connection with the registering mechanism, a clutch for governing said cam, a movable shaft connected to said clutch, a series of cam-arms mounted on said shaft, and a series of special keys having projections which engage and operate said cam-arms.

27. In a cash-register the combination with operating devices, a counter arranged to be thrown into connection therewith, a rotation-shaft, a cam for throwing the counter mounted loose on said shaft, a clutch mounted on said shaft so as to move therewith, a spring for normally forcing said clutch into engagement with the cam, a shaft arranged to move said clutch against the tension of its spring, and a series of special keys arranged to move said shaft.

28. In a cash-register the combination with an operating mechanism of a counter arranged to be thrown into connection with the same, a throwing device for said counter, a clutch controlling said device, special keys controlling said clutch, a printing mechanism including a special printer for the special keys, and a check-key for adjusting the printing mechanism to print a check when so desired.

29. In a cash-register the combination with operating devices, of a printing mechanism, two pivoted bell-crank platen-arms carrying platens for printing the check and detail-strip respectively, means connecting one of said platens to the movable parts of the machine, a slide coöperating with the adjacent parts of the bell-crank arms to couple the same together, and a slidable key for controlling said slide.

30. In a cash-register, the combination with a series of amount-keys arranged to have an initial movement, of a series of special keys, a common member, a lock for said special keys operated by the initial movement of the amount-keys, and a lock for the common member operated by the movement of the special keys.

31. In a cash-register, the combination with an operating mechanism, of type-carriers connected to the same and provided with diametrically-arranged duplicate sets of types, two pivoted platen-levers carrying platens arranged to print respectively from opposite sides of the type-carriers and formed with elongated slots, a slide connected to one of said platen-levers and adapted to rock with the same, a projection on said slide arranged to be moved into the slot of the remaining platen-lever to cause said levers to move together, a means for moving said slide, and a means connecting one of said platens with the operating mechanism.

32. In a cash-register, the combination with an operating mechanism, of a series of type-carriers operated thereby, a special check-key, two platen-levers carrying printing-platens, a slide operated by the check-key and carrying projections for coupling the two platen-levers together.

33. In a cash-register, the combination with an operating mechanism, of a counter comprising a series of counter-wheels mounted upon a rotary shaft and adapted to be picked up by said shaft and returned to zero, a cam carried by said shaft, a pivoted lever arranged to be operated by said cam, a rock-shaft actuated by said lever, a series of transfer devices, and means mounted on the rock-shaft and engaging the transfer devices to prevent the same being tripped when the counter-wheels are turned to zero.

34. In a cash-register, the combination with a printing mechanism arranged to print both a check and a detail-strip, of means for causing a check to be printed at will, and a special printing device constructed to print upon the detail-strip only when a check is issued.

35. In a cash-register, the combination with operating devices, of a printing mechanism, platens for printing a check and a detail-strip, means for causing the printing of a check at will, and a special type-carrier arranged to be operated by the check-platen to print upon the detail-strip.

36. In a cash-register, the combination with an operating mechanism, of a counter mounted in a movable frame, throwing devices for said frame, a clutch controlling said devices, a series of special keys, and means intermediate the special keys and clutch for operating the latter when any one of the special keys is operated.

37. In a cash-register, the combination with a printing mechanism, of a special printing device, means for causing the printing mechanism to print a check at will, and means for operating the special printing device only when a check is printed.

In testimony whereof I affix my signature in the presence of two witnesses.

THOMAS CARNEY.

Witnesses:
   ALVAN MACAULEY,
   IRA BERKSTRESSER.